United States Patent [19]

Wright

[11] 4,373,942
[45] Feb. 15, 1983

[54] CHLOROCARBON AND HALOGEN RECOVERY FROM VENT GAS STREAM

[75] Inventor: Danny W. Wright, Hickory, Ky.

[73] Assignee: Pennwalt Corporation, Philadelphia, Pa.

[21] Appl. No.: 232,747

[22] Filed: Feb. 9, 1981

[51] Int. Cl.³ .............................................. F25J 3/00
[52] U.S. Cl. .......................................... 62/12; 62/23; 570/262
[58] Field of Search ...................... 570/262; 62/11, 12, 62/23

[56] References Cited

U.S. PATENT DOCUMENTS

| | | | |
|---|---|---|---|
| 4,010,017 | 3/1977 | Loyless | 62/23 |
| 4,128,409 | 12/1978 | Bennett | 62/23 |
| 4,133,663 | 1/1979 | Skinner | 62/23 |

*Primary Examiner*—Norman Yudkoff
*Attorney, Agent, or Firm*—John S. Munday

[57] ABSTRACT

Apparatus for recovering chlorocarbons from a vent gas stream which additionally contains a halogen, including an inlet means connected to a source of the gas stream and a heat exchanger means for receiving the stream from the inlet means. The heat exchange means has a cooling capacity sufficient to reduce the temperature of the stream to less than about $-60°$ F. at a pressure of at least 60 psig. Finally, separator means are provided for receiving the stream at the reduced temperature and include means for separating the liquid from the vapor at that point.

The apparatus and the method of using the same is particularly suited for use with vent gas streams containing at least 1000 ppm of carbon tetrachloride and approximately 0.2 to 20% of a halogen, particularly chlorine, based upon the weight of the carbon tetrachloride. Preferred operating conditions are from about $-60°$ F. to about $-70°$ F. at a pressure ranging from 80 to 90 psig.

10 Claims, 1 Drawing Figure

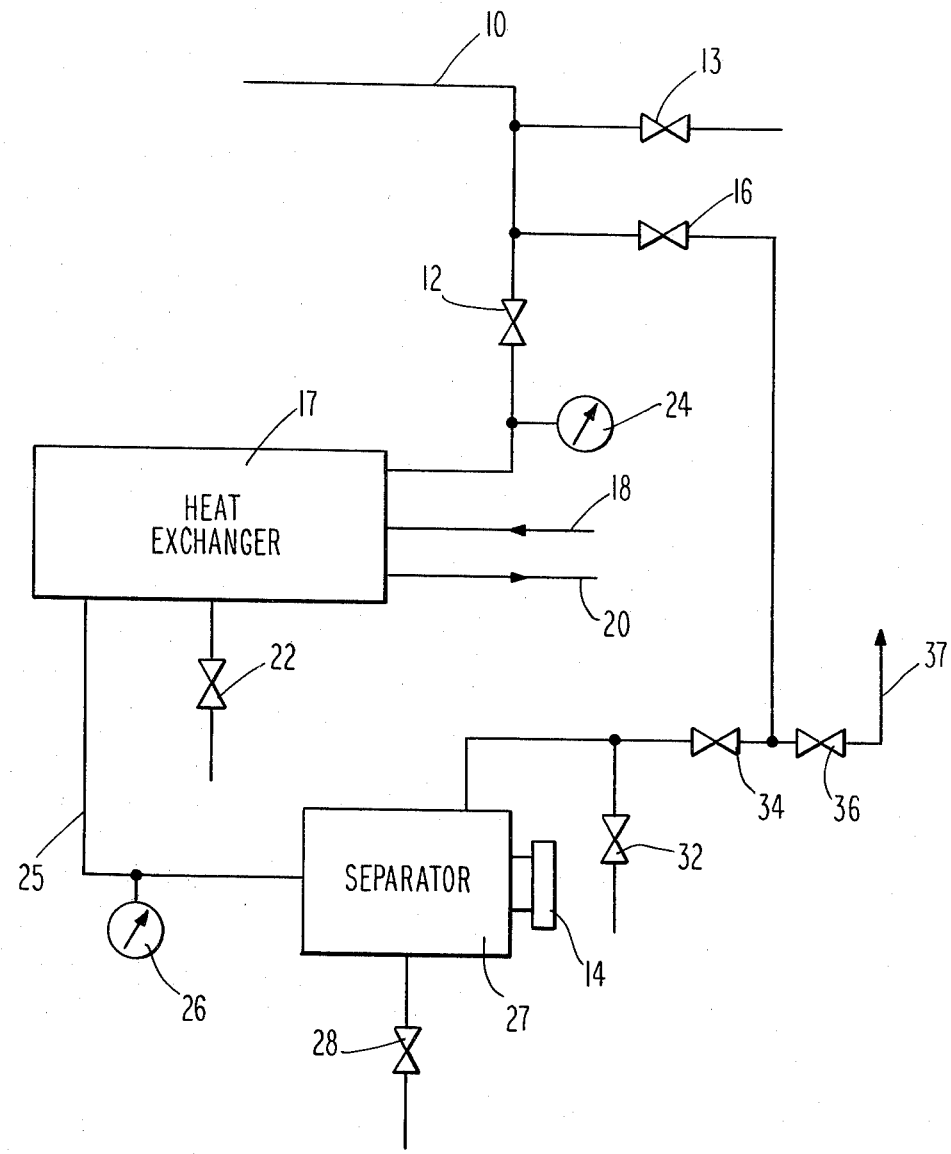

CHLOROCARBON AND HALOGEN RECOVERY FROM VENT GAS STREAM

Chlorocarbons such as carbon tetrachloride are oftentimes used to recover chlorine and other halogens in a wide variety of chemical processes. One particular process involves the absorption of a chlorine in a chilled carbon tetrachloride system with the chlorine being stripped in a recovery system by heating the chlorine saturated carbon tetrachloride. This produces a tail gas, which is vented to the atmosphere from the absorber. This gas contains significant quantities of both carbon tetrachloride and chlorine, and both should be recovered to prevent a yield loss as well as an environmental hazard.

U.S. Pat. No. 2,540,905 discloses a process for scrubbing a gas to recover chlorine from the mixture. The principle objective of the process is to overcome the contamination problem caused by the dissolution of carbon dioxide in the scrubbing liquid during chlorine recovery. The process involves scrubbing the gas with a stable, liquid halogenated hydrocarbon at a temperature sufficiently low to dissolve substantial amounts of chlorine and carbon dioxide. A major portion of the dissolved carbon dioxide and a portion of the dissolved chlorine is driven off from the scrubbed liquid at a temperature that is below the temperature at which substantially all of the chlorine would be removed therefrom. The scrubbing liquid is then heated to a higher temperature at which the chlorine remaining therein is driven off and recovered. Preferred scrubbing liquids are highly chlorinated propanes.

U.S. Pat. No. 2,765,873 discloses a method for recovering substantially pure chlorine from mixtures of chlorine and inert atmospheric gases. The method entails countercurrently contacting a stream of the gases to be treated and a stream of liquid carbon tetrachloride in an absorption zone at superatmospheric pressure of from about 30 to 210 psi to form a solution of chlorine in carbon tetrachloride. The temperature of the solution during passage through the absorption zone is maintained at from about 50° F. to about 90° F. above the temperature at which the carbon tetrachloride is introduced to the absorption zone. That introduction temperature is from about −9° F. to about 90° F. The solid gas solution is heated to boil off a major portion of the disolved atmospheric gases and a minor portion of dissolved chlorine. Purified chlorine is then removed or recovered from the remaining solution by distillation.

U.S. Pat. No. 3,399,537 discloses a multi-stage process for the absorption of chlorine gas in carbon tetrachloride. The object of this process is to control the operating parameters to prevent separation of liquid water from the gas, and thereby prevent corrosion of the absorption apparatus.

U.S. Pat. No. 3,793,801 relates to a two stage recovery of chlorinated hydrocarbons from a water containing gaseous product stream of an oxychlorinator. In the first stage, the gaseous stream is cooled to a temperature above the freezing point of water to condense the major portion of chlorinated hydrocarbons. In the second state, the remaining gaseous stream is cooled to below the freezing point of water to condense further chlorinated hydrocarbons. Prior to the second recovery stage, the gaseous stream is combined with hydrochloric acid to depress the freezing point of the water so that it will not interfere with the recovery.

U.S. Pat. No. 4,010,017 discloses a process for the recovery of hydrochloric acid from the product stream of a methylchloride formal chlorinator unit which contains hydrochloric acid and chloromethane. In carrying out this process, the entire gaseous stream is condensed at a temperature of from about −30° F. to −10° F. and at a pressure of from 20 to 500 psig. Thereafter, the condensate is transferred to a stripper in which the hydrochloric acid is converted to the gaseous phase and is separated from the chloromethane which remains in the liquid phase, and the two phases are then recovered.

British Pat. No. 664,615 discloses a process for the complete separation of pure chlorine from a gaseous mixture by treating the gaseous mixture with an anhydrous liquid absorbent capable of selectively absorbing chlorine from the mixture and deliberating chlorine by expelling it from the liquid absorbent.

Finally, an article in *Chemical Engineering Progress*, Vol. 70, No. 3, page 64–68 (1974) provides a detailed description of a method for recovering chlorine from the liquefacation tail gas of an electrolytic process plant. U.S. Pat. No. 2,785,055 describes a process for drying and purifying chlorine gas, while U.S. Pat. No. 3,076,043 discloses a method to recover high purity chloroform and carbon tetrachloride from mixtures of those materials which contain chlorinated aliphatic hydrocarbon impurities.

As can be seen, there are a wide variety of industrial processes which employ chlorocarbons in mixtures with halogens such as chlorine. Oftentimes, a vent gas stream is produced which contains small but significant quantities of the chlorocarbons and halogens. Removal of these materials from the vent gas stream is both economically and environmentally desirable.

SUMMARY OF THE INVENTION

The present invention is directed to a method and apparatus for recovering chlorocarbons from a vent gas stream which additionally contains a halogen. The method comprises the steps of cooling the vent gas stream to a temperature less than −60° F., at a pressure of at least 60 psig, followed by separating the condensed liquid from the remaining gas.

While any gaseous stream containing chlorocarbons and a halogen may be employed in the process of this invention, it is preferred that the stream contain at least 1000 ppm of the chlorocarbon. Preferably the stream may contain from about 2000 ppm to as much as 100,000 ppm of the chlorocarbon without significant variation in the system's efficiencies. Normally, the stream will contain from about 0.2 to 20% of a halogen, based upon the weight of the chlorocarbon. It is desirable that the stream contain sufficient halogen to reduce the freezing point of the chlorocarbon to less than about −30° F. For example, chlorine, in minor amounts as set forth above, has been found to reduce the freezing point of carbon tetrachloride from its pure freezing point of −9° F. to less than −40° F.

For maximum efficiencies, it is preferred that the temperature of the stream be reduced to about −60° F. to about −70° F. at a pressure ranging from about 80 to 90 psig. The process has been found to be most suitable for use in recovering carbon tetrachloride and chlorine from vent gas streams containing those materials.

The apparatus for carrying out the process of this invention include an inlet means connected to a source of the gas stream Heat exchanger means are provided for receiving the stream from the inlet means and has a cooling capacity to reduce the temperature of the stream to less than −60° F. at a pressure of at least 60 psig. Separator means are provided for receiving the stream at its reduced temperature and has means for separating the liquid from the vapor phase.

BRIEF DESCRIPTION OF THE DRAWINGS

For a more complete understanding of the invention, reference is hereby made to the FIGURE, which is a schematic flow diagram of a preferred embodiment of the present invention.

DETAILED DESCRIPTION OF THE PREFERRED EMBODIMENT

As shown in the FIGURE, a tail gas vent stream from a chlorine recovery system is transferred from a source not shown via Line 10 through Block Valve 12. Valves 13 and 32 permit sampling and maintenance of the fluid transfer system, while Back Pressure Control Valve 36 regulates the flow through Heat Exchanger 17. Suitable coolant is provided via Inlet 18 and Return 20 from a refrigeration system to lower the temperature of the gas stream to at least −60° F. and preferably from −60° F. to −70° F. The process is operable at lower temperatures, but it is less economically efficient. Drain Valve 22 permits the cleaning of the system and sampling at any time, while Gauge 24 monitors the temperature and pressure of the inlet stream into Heat Exchanger 17.

The cooled vent gas stream is exited from the Heat Exchanger 17 via Line 25 and passed into Separator Means 27. Gauge 26 monitors the temperature and pressure of the cooled stream leaving Heat Exchanger 17 and provides a control point for the coolant system. Level Indicator 14 monitors the liquid level in the Separator Means 27.

While various sorts of separator means may be employed, a knock-out pot is prefered, preferably equipped with a demister to coalesce liquid which may be carried by the vapor.

The liquid which is contained in Separator Means 27 is then drawn off via Valve 28 for further processing or reuse in the system. The gas from which the chlorocarbon and halogen have been removed is then passed via Line 30 to Back Pressure Control Valve 36. Sample Valve 32 permits analysis of the vented gas as desired. Similarly, Block Valves 12, 16 and 34 allow the system to be by-passed if necessary for maintenance. Line 37 permits exhaustion of the gas to the atmosphere.

To demonstrate the efficiencies of the present invention, a system as described in the drawing was constructed to recover carbon tetrachloride and chlorine from a tail gas vent stream of a chlorine recovery system.

A flow of approximately 87.5 SCFM was monitored through a Wallace and Tiernan Varea-Meter ® flow meter into a heat exchanger comprising a carbon tetrachloride chiller employing a refrigerant from a Copeland model W4WU-0500 with a 9TK-0500 using an R-502 coolant. At a temperature of −60° F., the capacity of the system was approximately 11,000 BTU per hour while at −80° F. the capacity was 5,600 BTU per hour. The heat exchanger was a finned tube exchanger having a 6-inch inner diameter shell with a length of 7 feet. Eighteen ¾-inch outside diameter carbon steel outer finned tubes completed the exchanger.

The chilled stream was then transferred to a separating means comprising a knock-out pot which included a mist eliminator. The knock-out pot was an 8-inch inside diameter by 2-foot long pot having an inlet baffle and a 6-inch thick mat of glass fiber for mist elimination.

Because carbon tetrachloride has a freezing point of −9° F., as compared to the operating temperatures from about −60° F. to −70° F., it was initially thought that the carbon tetrachloride would freeze on the tubes. However, during the operation of the tests, there was no evidence of any frost forming on the tubes. To verify this, the unit was shut down and "defrosted" with only very small quantities of liquid being recovered.

The liquid which was recovered from the system was analyzed and found to have a freezing point of −54.4° F. during one run. The presence of chlorine in the carbon tetrachloride substantially depressed the freezing point of the carbon tetrachloride. Typical analysis showed the recovered liquid would contain from 2000 to about 10,000 ppm of chlorine, based on the total liquid chlorine and carbon tetrachloride.

A number of analyses were made of the inlet and outlet concentrations of the system in operation. Approximately 90% of the carbon tetrachloride which was introduced into the system via the gas stream was recovered. The inlet gas contained a wide variation in inlet concentration as did the exit liquid. In one series of tests, the carbon tetrachloride in the gas stream was decreased from approximately 8000 ppm to 1000 ppm; 6500 ppm to 1700 ppm; 5400 ppm to 890 ppm; 7600 ppm to 815 pp; and 14,000 ppm to 1240 ppm. During these runs, the pressure was above 80 psig, with the pressure being determined primarily by the pressure in the system from which the gas is taken. Operating temperature of the liquid being collected ranged from −62° to −69° F.

The recovered materials from these experiments was found to be totally suitable for return to the chlorine stripper.

Having thus described the invention, what is claimed is:

1. A method of recovering chlorocarbons from a vent gas stream containing a chlorocarbon and halogen mixture, comprising:
    cooling said gas at a pressure of at least 60 psig to a temperature below the freezing point of the chlorocarbon and halogen mixture;
    transferring said cooled gas to a separation chamber to coalesce said mixture; and
    separating the mixture in liquid form from said gas.

2. The method of claim 1, wherein said temperature is less than −60° F.

3. The method of claim 2 wherein said stream contains sufficient halogen to reduce the freezing point of the chlorocarbon to less than −30° F.

4. The method of claim 3 when the temperature of said stream is reduced from about −60° F. to −70° F. at a pressure ranging from about 80 to 90 psig.

5. The method of claim 4 where the halogen is chlorine and the chlorocarbon is carbon tetrachloride.

6. The method of claim 1 wherein said stream contains at least 2000 ppm of carbon tetrachloride.

7. The method of claim 6 wherein said stream contains from 0.2 to 20% of a halogen, based upon the weight of said carbon tetrachloride.

8. Apparatus for recovering chlorocarbons from a vent gas stream containing a chlorocarbon and a halogen mixture, comprising:
    inlet means connected to a source of said gas stream;
    heat exchange means for receiving said stream from said inlet means and having cooling capacity to reduce the temperature of said stream to below the freezing point of the chlorocarbon and halogen mixture at a pressure of at least 60 psig;

separation means operably connected to said heat exchange means to receive said stream, including means to coalesce said mixture; and means for withdrawing said mixture in liquid form.

9. The apparatus of claim 8 wherein the temperature of said stream is reduced to from about −60° F. to about −70° F. at a pressure ranging from 80 to 90 psig.

10. The apparatus of claim 8 wherein the gas stream contains a quantity of carbon tetrachloride and chlorine.

* * * * *